INVENTOR
BRIAN WILLIAM MANLEY
BY
Frank R. Trifari
AGENT

March 8, 1966 B. W. MANLEY 3,239,766

CIRCUIT ARRANGEMENTS EMPLOYING CHARGE STORAGE TUBES

Filed Aug. 30, 1962 3 Sheets-Sheet 2

INVENTOR
BRIAN WILLIAM MANLEY
BY
Frank R. Jeifari
AGENT

INVENTOR
BRIAN WILLIAM MANLEY
BY Frank R. Trifari
AGENT

United States Patent Office
3,239,766
Patented Mar. 8, 1966

3,239,766
CIRCUIT ARRANGEMENTS EMPLOYING CHARGE STORAGE TUBES

Brian William Manley, Burgess Hill, Sussex, England, assignor to North American Philips Company, Inc., New York, N.Y.

Filed Aug. 30, 1962, Ser. No. 220,395
Claims priority, application Great Britain, Sept. 7, 1961, 32,248/61
8 Claims. (Cl. 328—124)

This invention relates to circuit arrangements employing charge storage tubes, and more particularly to arrangements capable of providing non-destructive read-out of the information stored.

In general, non-destructive reading in storage tubes is achieved by the use of a beam modulation process effected with the aid of a grid electrode interposed between the gun and the target. The insulating storage layer is supported on this metallic mesh. Potential variations on the surface of the insulator, established in the writing process, control the passage of an electron beam through the mesh, but the potentials are such that no electrons from the beam can land on the insulator. In the case of a display storage tube such as the RCA 7183, the beam strikes a fluorescent screen after passing through the mesh. In an information storage tube such as the Raytheon CK 7702, the focused beam scans over the mesh area, and the transmitted electrons reach a final electrode to constitute the output signal. Grid modulation reading of this type preserves the stored charge and, in the case of a tube like the Hughes Memotron operated in a bistable mode, augments it, so that reading may proceed for long periods.

All the tubes referred to above are very expensive and have had to be designed and made specially for non-destructive read-out purposes. In addition it is a difficulty with tubes of this type (which operate with electron beams having energies of some 2 or 3 kv.) to erase the stored information completely in a short time. It is a principal object of the invention to provide improved circuit arrangements adapted for use with cheaper general-purpose charge storage tubes and having the additional advantage that rapid and complete erasure is possible. (These arrangements are alternatives to those described in my co-pending U.S. application Serial No. 220,315, filed August 29, 1962).

In the following, the term "secondary-emissive" is intended to cover substances having a secondary-emission coefficient ($\delta$) which is less than unity when bombarded with electrons of energy less than a certain critical value known as the "first cross-over" potential and a secondary-emission coefficient greater than unity for a range of bombarding energies above this critical energy. The materials used may have a second cross-over potential where the co-efficient is unity again before becoming smaller, but materials can also be used in which said second cross-over does not exist for practical purposes or cannot be determined.

The invention provides a circuit arrangement comprising a charge storage tube having an electron gun for producing an electron beam which gun includes a cathode, a control grid and an anode, and having a target having an uninterrupted secondary-emissive insulating storage surface which target is provided with a backing of electrically conductive material and a collector for collecting electrons obtained by secondary emission from said target, the circuit arrangement also comprising means for causing the beam to effect writing in a focused condition over a first path, the form of which path is representative of input signals, so as to cause a charge pattern to be set up on the storage surface along said first path, means for causing the beam to effect a reading scan of raster form over a second path intersecting said first path at a plurality of spaced points while maintaining the beam in a constant-current focused condition and ensuring that the potential difference between each part of the target scanned and the cathode is greater than the first cross-over potential of the material of the target but less than any second cross-over potential, and an output circuit for deriving an output signal, simultaneously with said reading scan, from the transfer of secondary electrons from the target to the collector.

The potential charge pattern required to effect co-planar grid action (described below) can be established by depositing charge on, or transferring charge to, the target surface. The resulting charge pattern stored on the target may be positive or negative depending on the manner in which the charges are deposited or transferred, but it should be understood that the polarity of the charge pattern does not define in any way the potential levels on the written parts of the target. These potential levels must always be suitable to produce the co-planar grid action to be described.

In the above definition the term "insulating" includes target materials which can, in known manner, be rendered conductive by bombardment with high-energy electrons but remain non-conductive under bombardment by low-energy electrons such as are used in the reading process. If the latter type of material is used, then the writing can be done by bombardment-induced conductivity obtained by scanning with high-energy (e.g. 6 kv.) electrons; then the target backing may be maintained at a positive potential with respect to the bombarded surface so that, when the writing process renders the target conductive, the potential gradient through the thickness of the target will transfer positive charge to the target surface (or a negative backing may transfer negative charge).

Alternatively, the writing can be done by secondary emission in which case it is necessary to ensure that the potential difference between each part of the target scanned and the cathode is at all points greater than the first cross-over potential of the material of the target but less than any second cross-over potential.

The reading operation employs secondary-emission and is based on the principle that the grid action of the target for each reading scan is controlled by the electrostatic fields of the written charge pattern in a manner which will be described more fully, and this control effect will, for convenience, be referred to as "co-planar grid action" from the analogy of a control grid lying in the same plane as the target surface (but this term does not imply that the target surface must in all cases be a plane surface). Said charge pattern is not destroyed by a reading scan because the latter takes place (except for the points of intersection) on different parts of the target. In the operation of such a circuit arrangement, the output information obtained during the scan of any element of the second path corresponds to the positive charge which can be deposited on that element despite the presence of written charge on the adjacent elements of the first path and this in turn will depend on the magnitude of the resultant negative charge already deposited on said first path. (The term "element" refers to an arbitrary elemental area occupied by one "bit" of information in a binary system or one picture element in a television or like system, and should not be taken as implying any physical subdivision or discontinuity in the target surface.) In other words, the areas unscanned during the reading operation (including the elements of the written charge pattern) take the place of the interposed storage grid of the aforesaid RCA and Raytheon tubes and act so as to control the action of the beam during its reading scan. This control action is quite different since it is no longer a question of controlling the passage of the beam (through grid apertures)

to a more distant, and separate, target. With the present invention what is controlled is the ability of secondary electrons to escape to the collector electrode from the target areas scanned in the reading process, and it is this latter process (which can be repeated) that provides the read-out signal.

In view of this mode of operation, a charge storage grid is no longer required, and this is one of the reasons why a cheaper and simpler tube can be used for non-destructive reading. One such tube is the Mullard Tenicon tube (type ME 1260) which is a low voltage, single gun information storage tube employing a capacitive discharge read-out process, and the feature of low voltage operation is a further advantage. This tube has a collector mesh parallel to the target, but this mesh is made entirely of metal and is not a storage mesh; in principle, even this mesh can be dispensed with for the purposes of the present invention provided that it is replaced by some other form of collector electrode (e.g. a peripheral ring) which is suitable in the sense of being able to provide a substantially uniform collecting field all over the target.

A typical application of the invention is the storage of an oscilloscope-type trace by means of the writing process, followed by a reading scan constituted by a raster of spaced parallel lines which intersect the trace, output signals being produced at each intersection so that the information of the trace is read out as a series of samples. The embodiment described below is of this type.

As for the process involved in reading out, there is more than one way in which it can be rendered repetitive. Each reading scan may be followed by a re-stabilizing scan which destroys the pattern generated by the reading process; for this re-stabilizing scan it is ensured that the potential difference between each target element scanned and the cathode is less than the first cross-over potential of the material of the target. Although re-stabilization could be effected as a raster scan with a defocused beam, re-stabilization could, with an appropriate tube, be performed by flooding the whole target with a stationary beam since this would not destroy the stored pattern.

Preferably, as in the embodiment illustrated, the re-stabilizing process is omitted, and this leads to a bipotential type of operation suitable for oscilloscope work. The first reading scan or scans establish the read path at equilibrium potentials determined by the co-planar grid action of the adjacent written elements. Successive reading scans (which may be several thousands) provide signals of substantially constant amplitude generated (as far as can be ascertained) by redistribution effects in the areas of the reading lines.

The aforesaid embodiment of the invention will now be described by way of example with reference to the accompanying diagrammatic drawings as applied to the secondary-emission mode of writing. In the drawings.

Figure 1:
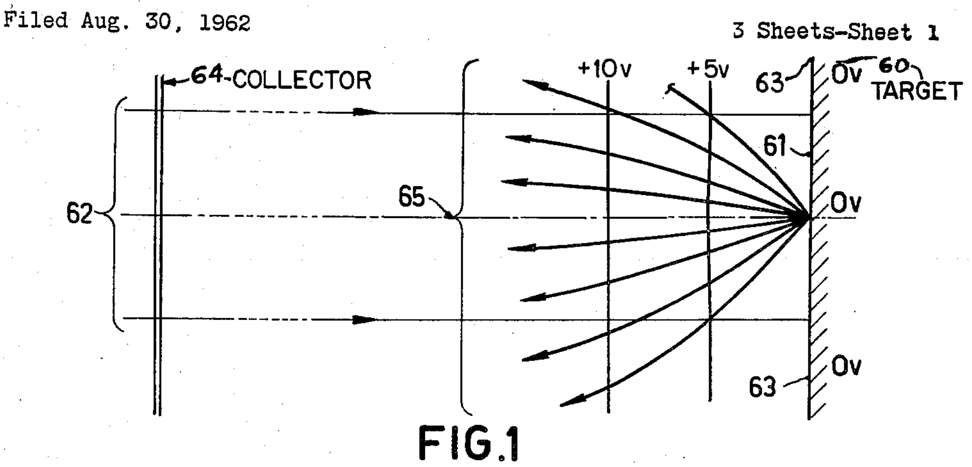
FIGURES 1 to 4 illustrate the co-planar grid action.

The embodiment will be described as applied to the Tenicon or to a similar storage tube having a collector mesh parallel to the target surface and magnetic focusing. The co-planar grid action and the operation of the embodiment will be described, for convenience, with the aid of specific voltage values; although these are realistic, they should not be taken as being limitative in any way.

Referring to the drawings, the so-called co-planar grid action will be described first with reference to FIGURES 1 to 4.

Figure 2:
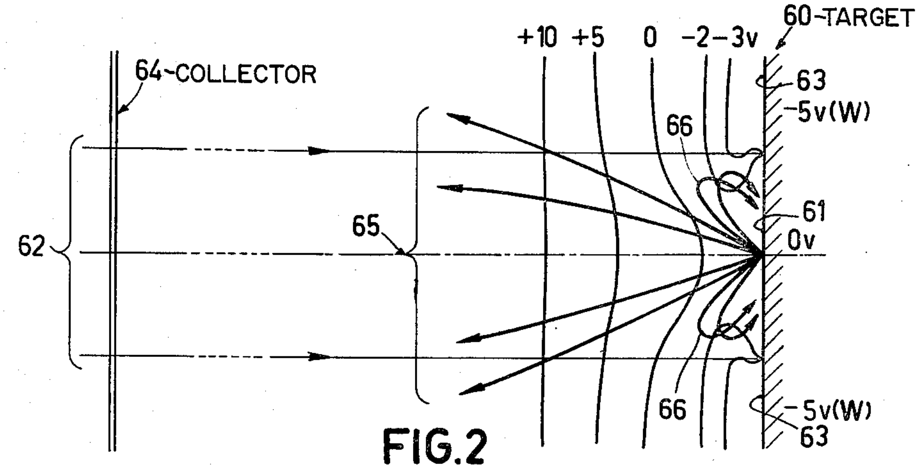
Figure 3:
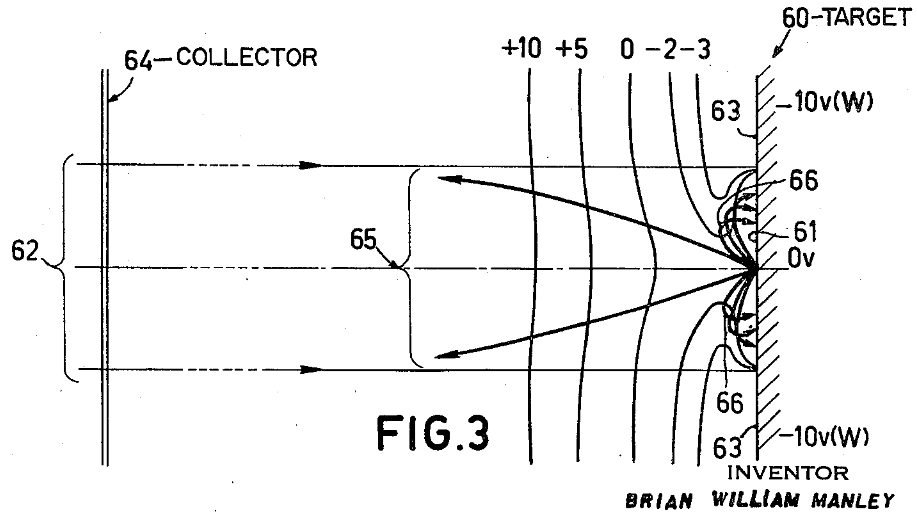

In each of FIGURES 1 to 3, it should be assumed that a target element is being read by bombardment with a beam $b$ of finite cross-section, while the adjacent elements W on either side have a charge which has been written into them in the writing process. Each of these figures is, in effect, the cross-section of the target taken through an intersection point, the plane of the section being so orientated as to contain the centre line of the relevant part of the written trace.

The more negative the adjacent written potentials, the fewer secondary electrons can escape from the target to the collector.

FIGURE 1 represents the case when all target elements are at the same potential, in which case all secondary electrons produced at the bombarded element are drawn to the collector.

In FIGURE 2 the negative potential regions surrounding the bombarded element influence the potentials in front of the target in the way indicated by the lines representing equipotential surfaces. In this condition only a portion of the secondary electrons liberated at the bombarded element escape to the collector, some of the secondary electrons being returned to adjoining regions of the target as indicated by trajectories 66.

In FIGURE 3 the surrounding negative target areas are reduced to a value (e.g. −10 volts) at which value the number of secondary electrons escaping to the collector is assumed to be equal to the number of primary electrons striking the target area. This can be referred to as the equilibrium condition, and it can be said that the value (e.g. −10 v.) of the negative surrounding potential is the value at which the effective (apparent) secondary emission coefficient is reduced to unity. Although an equilibrium voltage of −10 v. is a realistic example, the actual potential difference at which the effective secondary-emission coefficient is reduced to unity will be determined by the width of the space between the written lines and the magnitude of the electric field normal to the bombarded element, resulting from the potential of the collector mesh.

When an element of the target surface is bombarded in this condition, the potential of the element does not change.

Figures 4, 5A, 5B, 5C:
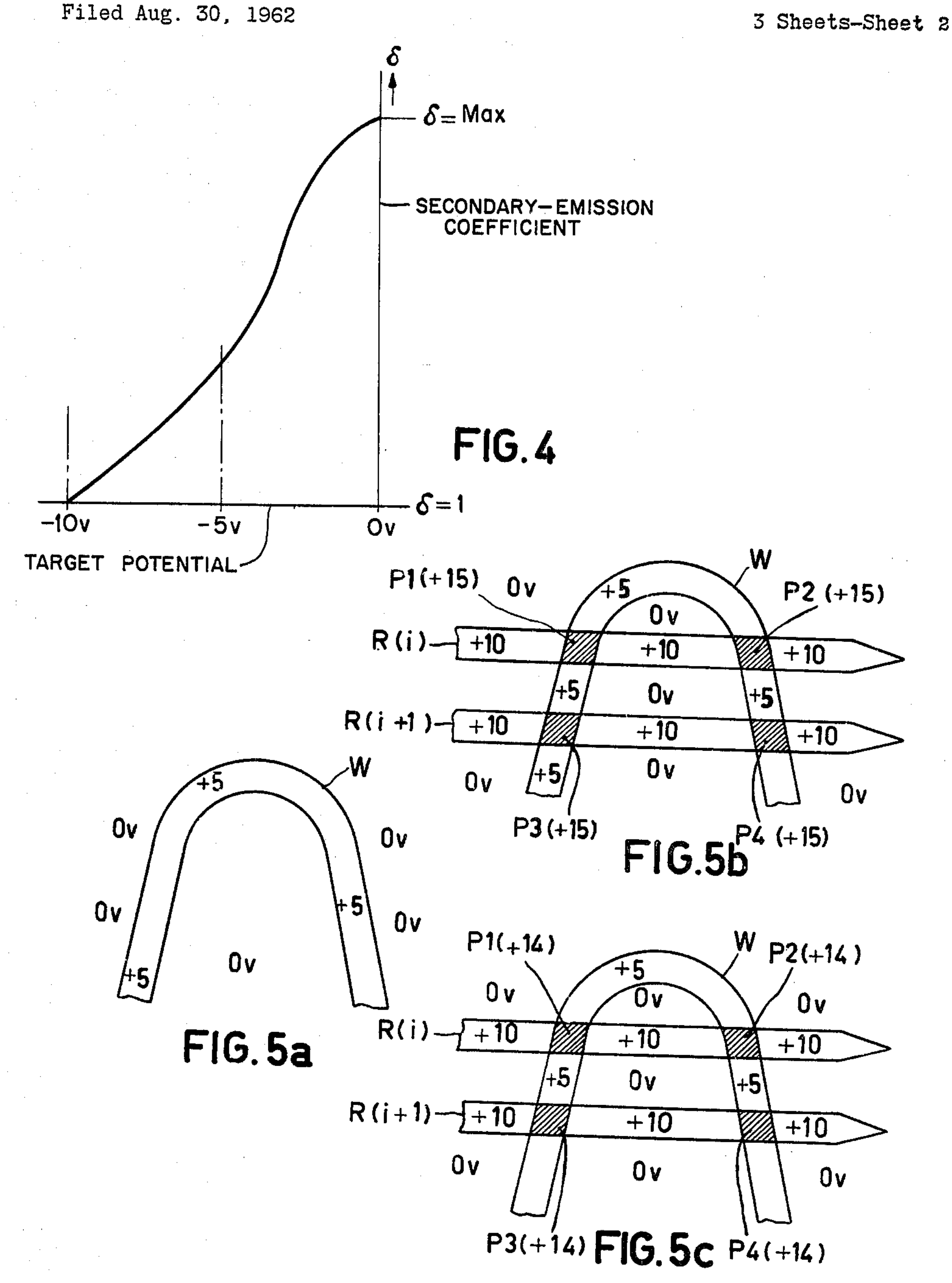
FIGURES 5A to 5C are charge writing and reading diagrams relating to the embodiment.

FIGURE 4 represents the changes in the aforesaid effective secondary emission coefficient in dependence upon changes in the negative potential of the adjacent written elements of FIGURES 1 to 3. Thus a coefficient of unity (equilibrium) corresponds to an adjacent potential of −10 v. (FIGURE 3) while the maximum coefficient (which may be about 4) corresponds to an adjacent potential of zero volts (FIGURE 1).

The voltages given in FIGURES 1 to 4 should only be regarded as relative, i.e. equilibrium occurs with a potential difference of 10 volts between read and written elements even when the absolute values (−10 and zero) are changed. Thus, in the following description of the embodiment, equilibrium will be attained e.g. with voltage values of zero and +10 instead of −10 and zero.

In FIGURE 5A, which schematically depicts the charge distribution on a portion of the target surface, the unexplored target area is at a uniform initial level of zero volts (0 v.). A part of an oscillograph trace (representing the waveform of an input signal) is indicated at W, and the effect of the writing of this trace is that the relevant elements of the target have been raised to +5 v. by secondary emission. Since the equilibrium condition is assumed to be the same as that of FIGURES 1 to 4, namely a difference of 10 v., the writing of the trace could be performed in such manner as to raise the trace to a higher potential, namely to a maximum of +10 v. set by co-planar grid action. However, this is not necessary and may not be advantageous so that the value of +5 v. is more typical of practical conditions.

FIGURE 5B shows the same oscillograph trace W and, in addition, two successive lines ($R(i)$ and $R(i+1)$) of the raster of lines constituting the read scan. These lines intersect the trace W at points of intersection P1 to P4. The potentials indicated along the lines R are those which exist immediately after the beam has passed. Except at the points of intersection, the target elements are raised to the maximum (equilibrium) value of +10 v. by secondary emission until the co-planar grid action of the adjacent 0 v. elements prevents further positive excursions (this is the equilibrium state of FIGURE 3, and corresponds to a difference of 10 v. between a read element and the adjacent elements); this takes the read elements up to +10 v. and may be achieved with a single initial raster scan or it may take a series of initial raster scans. At the points of interesection P1 to P4, the target is also raised to the maximum (equilibrium) value; since the equilibrium conditions occur with a difference of 10 v. (in accordance with FIGURES 1 to 4), the maximum voltage is +15 v. since these particular elements are located between areas which are at +5 v. Of course, this is a simplification since there are also areas at zero volts in the vicinity, and these will have a small effect on the ultimate potentials of points P1 to P4.

Both the writing and reading processes may be performed with the cathode potential at about −100 v. and the collector mesh (which is spaced a few millimetres from the target in the case of a Tenicon tube) at about +200 v.

After the beam has passed points P1 to P4, it will continue to explore the whole target with a continuing raster of spaced parallel lines. During these subsequent line scans of the same reading raster, secondary electrons are redistributed to some extent but can go only to those parts of the target more positive than the element from which they are liberated. They fall therefore only on the most positive elements (+15) indicated in FIGURE 5B. Thus the potential of such an element changes negatively (e.g. to +14 v., FIGURE 5C) during the course of a reading scan until the next arrival of the beam at that element. During the passage of the beam over that element, the area is again charged positively to its maximum permissible potential (e.g. from +14 v. to +15 v.), by a loss of electrons to the collector, thus giving rise to an output signal from the target. As for the read elements at +10 v., their potential does not drift negatively to any material extent during the progress of a read scan and therefore substantially no signal output occurs when they are re-scanned.

If the elements which had reached the highest positive potential (+15 v.) were to remain at the potential during the course of each reading scan, they would always be found (at the next scan) in the equilibrium condition where the effective secondary emission coefficient is unity. If this were so, they could not be shifted in potential by the passage of the beam during the new reading scan and they could therefore not give an output in any reading scans other than the first, or first few, reading scans. It is only because of the redistribution effect just described (whereby an element at +15 v. drifts down to say, +14 v. during the remainder of each reading scan) that more than one read-out is possible without the need for a re-stabilizing scan.

As successive read scans are performed, electrons in the skirts of the electron beam land in the areas adjacent to the read lines and charge them positively by a small fraction of a volt in each scan, due to secondary emission. However, this does not affect the output signal amplitude since the potentials of the read lines, which are determined by co-planar grid action, will rise slowly by a similar amount. The modulation depth on the target is therefore maintained, while all areas of the target move positively at about the same slow rate. The storage time is limited by the target potential thus approaching that of the collector. The storage time depends upon line density but, with 200 read lines in a target diameter of 25 mm., about 9000 read-outs may be obtained before the amplitude of the output signal drops by a factor of 2. It is worth noting that the output signal in fact remains sensibly constant during about the first 8000 read operations and falls rapidly in the last 1000 scans.

In the Tenicon (when used in the present arrangement), written areas of the target are shifted positively, with successive read-outs, by the release of secondary electrons generated by the arrival of primary electrons in the skirts of the electron beam used in the reading process, which skirts over-lap the written paths. Erasing consists of restoring all the target areas to the most negative value, i.e. 0 v. This is accomplished by scanning the target with the cathode at a potential of 0 v. and the collector at a potential (e.g. +20) such that the potential difference between collector and cathode during this scan is less than the first cross-over potential. All scanned areas of the target will then be stabilized at 0 v. A defocused beam may be used since it is of no consequence that the areas of the target which are to be used for reading are also stabilized at 0 v. by this operation; in fact, the read elements will be driven positively in the first, or first few, reading scans and will thus adopt their equilibrium values.

A notable feature of the erasing process is that it leaves no residual image. The problem of a residual image after erasing is common to many non-destructive read-out tubes and is probably a function of the high voltage at which the target is bombarded.

Figure 6:
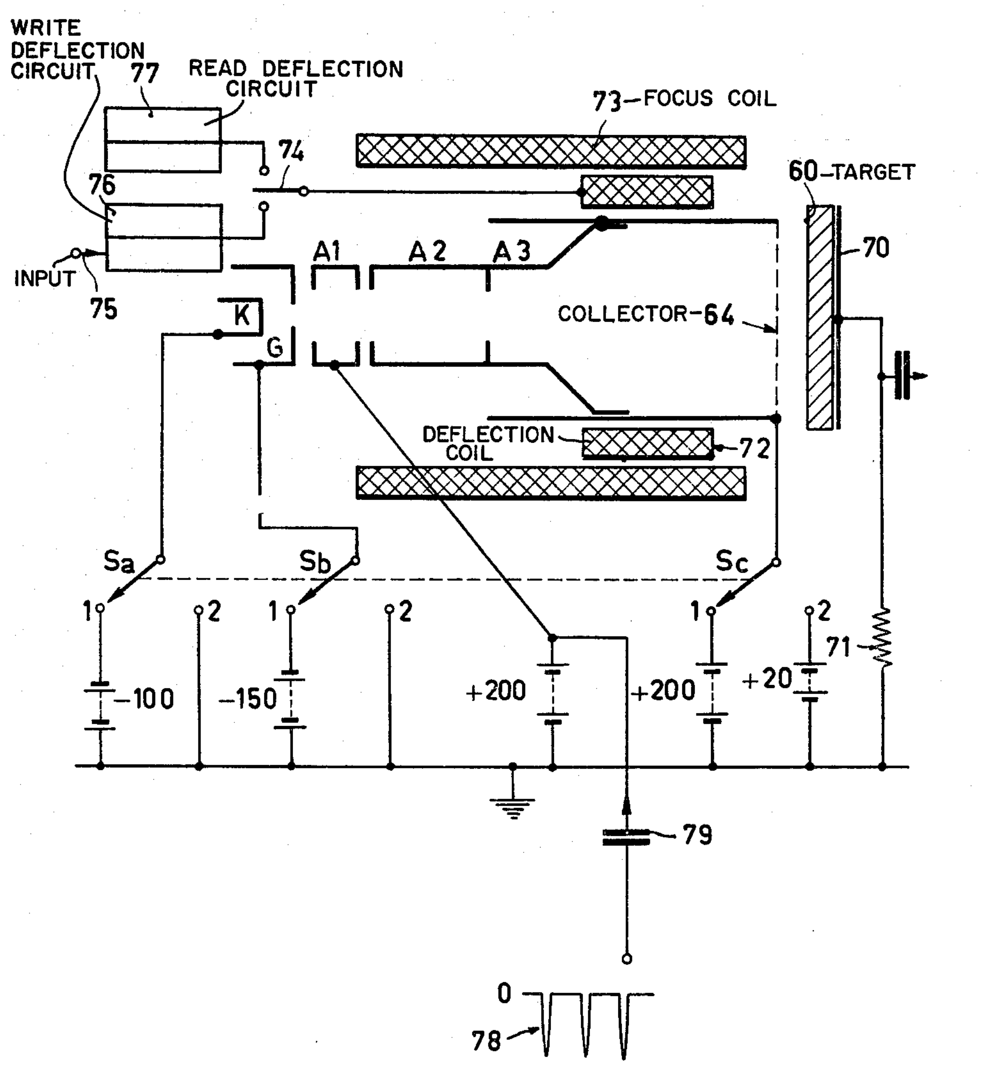
FIGURE 6 is a circuit diagram.

One possible circuit arrangement suitable for this embodiment is shown schematically in FIGURE 6. The tube is a Mullard Tenicon tube with anodes A2 and A3 connected together. The output circuit employs the backing 70 of the target 60 as a signal plate coupled to an amplifier and connected to an output load impedance 71 the other end of which load is held at earth potential. The first anode (A1) has applied to it negative-going flyback suppression pulses which, of course, have to be related to the particular scans used for writing and reading (the means for ensuring this correlation are omitted for simplicity).

The voltage values given are, again, realistic (for the Tenicon) but not limitative. Magnetic deflection and focusing are employed by means of coils 72 and 73 respectively, in the conventional manner.

The deflection coils 72, which for simplicity are shown as a single coil only can be connected by means of a switch 74 to either one of two deflection units 76 and 77, respectively.

The horizontal and vertical deflection circuits are shown combined for simplicity. The switch 74 is in reality a multiple system and it has a writing position in which deflection unit 76 is operatively connected with coils 72 whereby a line time-base is connected to one pair of deflecting coils, for example, the horizontal deflection coil, while the input signal supplied to terminal 75 is connected to the other pair, for example, the vertical deflection coil. Switch 74 also has a reading position in which deflection unit 77 is operatively connected with coils 72 whereby a line time-base (in many cases a different one from that used in the writing operation) is connected to one pair of deflecting coils while a frame time base is connected to the other pair. Flyback beam suppression pulses 78 may be applied to the first anode $A_1$ via a capacitor 79. The grid-cathode (G–K) conditions for the various operations are determined by a triple ganged switch system S*a*–S*b*–S*c* having positions "1" and "2."

The beam is in focus when the focus coil 73 is energized, 200 volts are applied to anodes A2–A3, and the cathode is at −100 v.

The system provides for the following operations:

(*1*) *Erasure*

This is effected by one or more scans in which the target is stabilized all over at 0 v. The switches S*a*–S*b*–S*c* are in position "2" so that grid and cathode are at the same potential which allows a sufficiently large beam current to effect erasure. The collector is switched to +20 v. (by switch S*c*) so that the potential difference between it and cathode K is below the first cross-over.

(*2*) *Writing*

Switches S*a*–S*b*–S*c* are in position "1." The D.C. bias on the grid is —50 v. with reference to cathode K, which is above the cut-off potential of the gun. The input signal is applied via terminal 75 and deflection unit 76 to one set of deflection coils while a line scan is applied to the other. With —50 volts bias the available beam current is arranged to drive the target from 0 v. to +10 v.

(3) *Reading*

Switches *Sa–Sb–Sc* are again in position "1" and by means of deflection unit 77, both line and frame scans are applied to the deflection coils 72. The grid is again at —50 v. with reference to cathode and this determines the amplitude of the output signal across lead 71.

In the arrangement described, the collector mesh may conveniently have a transparency of about 60 to 70% with 750 meshes per inch, and it may be disposed at a distance from the target within the range of 2 to 10 mm., preferably a distance of 3 mm. The material of the target may be mica.

The arrangement illustrated has the advantage that it is adapted to maintain the same conditions, both for reading and for writing, at all the circuit elements effecting the focus of the beam.

Whereas the arrangement illustrated has been described as applied to secondary-emissive writing, the arrangement may be modified to operate with bombardment-induced conductivity writing. For this purpose the target material must be changed from mica to e.g. ZnS or magnesium fluoride and the D.C. voltage applied to the end of the output load remote from backing plate 70 may be changed from earth to a positive value of about 20 volts. In this case the charge pattern is written as positive charge but it may be changed to a negative charge pattern by suitably changing the target material and changing the +20 v. (applied to the load) to, say, —20 v.

Although the embodiment described employs the backing of the target as a signal plate from which the output is obtained it is possible in some cases to derive the output from the collector.

What I claim is:

1. An electrical storage system comprising a charge storage tube having a target member for storing information, said target having a storage surface comprising an uninterrupted layer of secondary-emissive insulating material and an electrically conductive backplate, an electron gun for projecting a beam of electrons onto said target surface, a collector electrode positioned near said target for collecting secondary emission electrons from said target, means for writing information on said target surface comprising means for focusing said electron beam, means for deflecting said focused beam over a first path on said surface having a contour which is determined by an input information signal to be stored, and means for maintaining said beam at an effective electron velocity above the first cross-over point of the target material whereby an electric charge pattern is set up in said first path, read-out means comprising means for maintaining said beam in a constant current focused condition and at an effective electron velocity above said first cross-over point and means for scanning said beam over said target surface in a second path comprising a raster of lines which intersect said first at a plurality of spaced apart points, and an output circuit responsive to the transfer of secondary electrons from the target to the collector during said read scan for deriving an output signal determined by the charge pattern stored in said first path.

2. Apparatus as described in claim 1 wherein said collector electrode comprises a grid-like structure which is uniformly spaced from said target.

3. Apparatus as described in claim 1 further comprising a source of operating voltages for said electron gun, means for connecting said source of operating voltages to the elements of said gun during said read and write scans, and means for maintaining the same operating voltages at each of the gun elements which affect the electron beam focus during said read and write scans.

4. Apparatus as described in claim 1 wherein said deflecting means comprises first and second deflection coils mounted about said electron gun to deflect said electron beam in different directions, said writing means further comprising means for applying an electric signal representative of said information to be stored to one of said deflection coils, and means for applying a time-base signal to said other deflection coil.

5. An electrical signal storage system comprising a charge storage tube having a target member for storing information, said target having a storage surface comprising an uninterrupted layer of secondary-emissive insulating material and an electrically conductive backplate, an electron gun including a cathode, control grid and anode for projecting a beam of electrons onto said target surface, a collector electrode position near said target for collecting secondary emission electrons from said target, means for writing information on said target surface comprising means for focusing said electron beam, means for deflecting said focused beam over a first path on said surface having a contour which is determined by an input information signal to be stored, and means for maintaining the potential difference between each point on the target scanned and said cathode at a value above the first cross-over potential of the target material and below any second cross-over potential whereby a positive charge pattern is set up in said first path, read-out means comprising means form aintaining said beam in a constant current focused conditions, means for maintaining the potential difference between each point on the target scanned and said cathode at a value above the first cross-over potential of the target material and below any second cross-over potential independently of the state of charge of the target surface encountered by the electron beam, and means for scanning said beam over said target surface in a raster of substantially parallel lines which intersect said first path at a plurality of space points, and an output circuit responsive to the transfer of secondary electrons from the target to the collector during said read scan for deriving an output signal determined by the charge pattern stored in said first path.

6. Apparatus as described in claim 5 further comprising means for erasing the information charge pattern stored on said target surface, said erasing means comprising means for scanning said target surface with a defocused electron beam and means for maintaining the potential difference between said collector electrode and cathode below the first cross-over potential of the target material.

7. An electrical signal storage system comprising a charge storage tube having a target member for storing information, said target having a storage surface comprising an uninterrupted layer of secondary-emissive insulating material and an electrically conductive backplate, an electron gun including a cathode, control grid and anode for projecting a beam of electrons onto said target surface, a collector electrode positioned near said target for collecting secondary emission electrons from said target, means for writing information on said target surface comprising means for focusing said electron beam, means for deflecting said focused beam over a first path on said surface having a contour which is determined by an input information signal to be stored, and means for maintaining the potential difference between each point on the target scanned and said cathode constant during the write scan at a value above the first cross-over potential of the target material and below any second cross-over potential whereby a positive charge pattern is set up in said first path wherein all points on said path are at substantially the same positive potential, read-out means comprising means for maintaining said beam in a constant current focused condition, means for maintaining the potential difference between each point on the target scanned and said cathode at a value above the first cross-over potential of the target material and below any second cross-over potential, and means for scanning said beam over said target surface in a raster of substantially parallel lines which intersect said first path at a plurality of spaced points, and an output circuit responsive to the transfer of secondary electrons from the target to the collector during said read scan for deriving an output signal determined by the charge pattern stored in said first path.

8. An information storage tube comprising a target member for storing an electric charge pattern, said target member comprising an electrically conductive backplate and an electric charge-retaining surface supported thereon and composed of a layer of secondary-emissive insulating material, means for projecting an electron beam onto said target surface, a collector electrode positioned near said target for collecting secondary emission electrons from said target, means for writing a charge pattern on said target surface comprising means for focusing said electron beam and means for deflecting said focused beam over a first path on said surface having a contour which is determined by the information signal to be stored, read-out means for said stored charge pattern comprising means for scanning a constant current focused electron beam over a second path on said target surface comprising a raster of lines which intersect said first path at a plurality of spaced apart points and means for maintaining said constant current focused beam at an effective electron velocity above the first cross-over point of the target material, and output means responsive to the transfer of secondary electrons from the target to the collector during the read scan for deriving an output signal determined by the charge pattern stored in said first path.

References Cited by the Examiner

UNITED STATES PATENTS

| | | | |
|---|---|---|---|
| 2,717,976 | 9/1955 | Baker | 315—13 |
| 2,777,060 | 1/1957 | Waters | 328—124 |
| 2,794,937 | 6/1957 | Williams et al. | 315—12 |
| 2,855,541 | 10/1958 | Bivans | 315—12 |
| 2,859,376 | 11/1958 | Kirkpatrick | 315—8.5 |
| 2,901,662 | 8/1959 | Nozick | 315—12 |
| 3,046,431 | 7/1962 | Nicholson | 313—65 |

ARTHUR GAUSS, *Primary Examiner.*

JOHN W. HUCKERT, *Examiner.*